United States Patent
Loose

[15] 3,694,593
[45] Sept. 26, 1972

[54] ELECTRICAL SWITCH FOR USE ON A SEAT BELT REEL WITH DIAMETER SENSING AND SWITCH ACTUATOR MEANS

[72] Inventor: Winfield Warren Loose, Linglestown, Pa.

[73] Assignee: AMP Incorporated, Harrisburg, Pa. 17105

[22] Filed: Dec. 6, 1971

[21] Appl. No.: 204,862

Related U.S. Application Data

[62] Division of Ser. No. 167,061, Aug. 17, 1971, Pat. No. 3,632,059.

[52] U.S. Cl. .............................. 200/52 R, 200/61.16
[51] Int. Cl. ..................... H01h 35/00, H01h 25/14
[58] Field of Search ....... 180/82; 200/61.16, 61.58 B; 242/107 SB; 280/150 SB; 297/388; 340/52 E, 278

[56] References Cited

UNITED STATES PATENTS

| | | | |
|---|---|---|---|
| 3,340,523 | 9/1967 | Whitman | 340/278 |
| 3,375,495 | 3/1968 | Burns | 340/278 X |
| 3,381,268 | 4/1968 | Boblitz | 340/278 X |
| 3,504,336 | 3/1970 | Boblitz | 340/278 |
| 3,506,305 | 4/1970 | Eineman, Jr. et al. | 340/52 E UX |
| 3,519,771 | 7/1970 | Burns | 200/61.58 B |

*Primary Examiner*—J. R. Scott
*Attorney*—William J. Keating et al.

[57] ABSTRACT

Electrical switch for use with seat belt reel comprises a low-profile triangular housing having one switch arm extending along one side of housing, around an apex, and along an adjacent side. The other switch arm extends along the adjacent side. The second switch arm is moved against the first switch arm to close the switch by a pin which extends from the reel into the housing.

5 Claims, 1 Drawing Figure

PATENTED SEP 26 1972 3,694,593
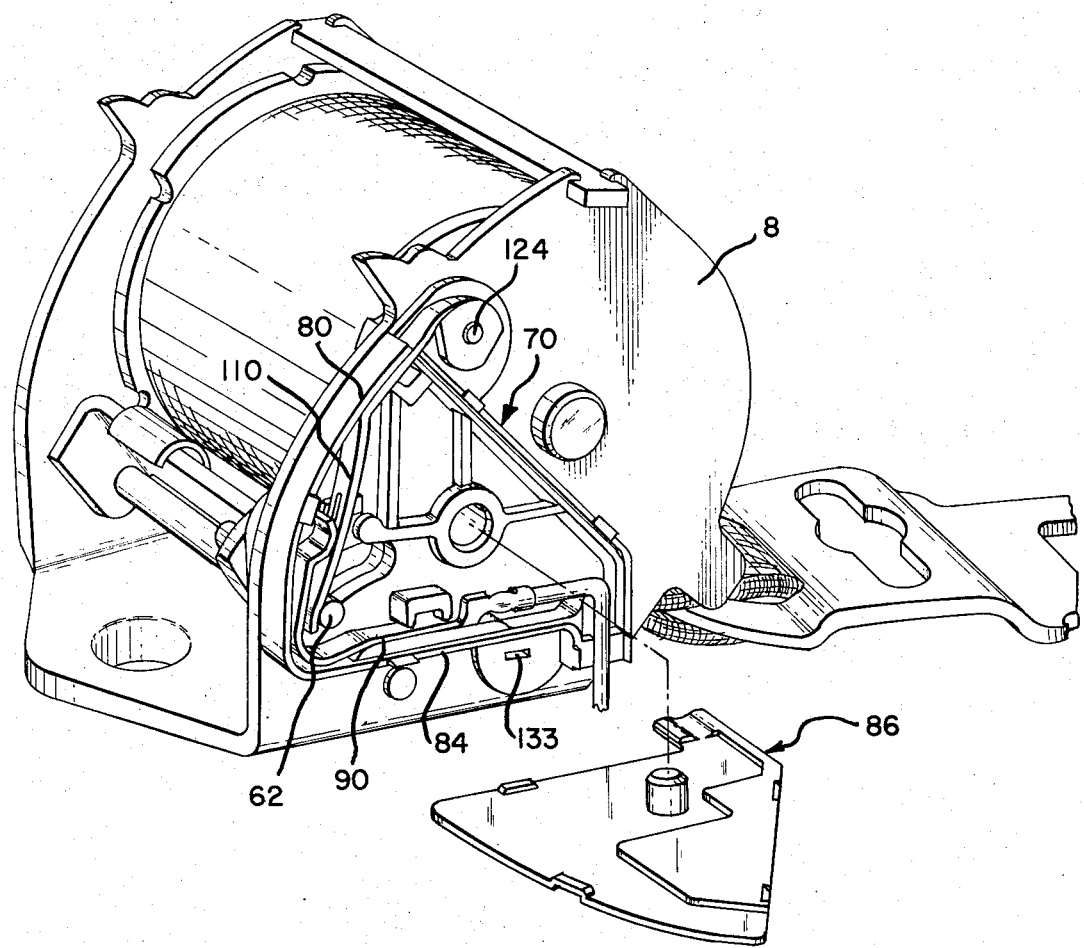

3,694,593

ELECTRICAL SWITCH FOR USE ON A SEAT BELT REEL WITH DIAMETER SENSING AND SWITCH ACTUATOR MEANS

This application is a division of application, Ser. No. 167,061, filed Aug. 17, 1971 now U.S. Pat. No. 3,632,059 which is hereby incorporated by reference in its entirety.

BACKGROUND OF THE INVENTION

A preferred embodiment of the invention, as shown in the accompanying drawing comprises a generally triangular plastic housing or switch body 70 having a cover 86. The housing is secured against one frame plate 8 of the retractor reel by a metallic fastener 124 and a plastic fastener 133 which is integral with the housing. The metallic fastener also functions to electrically connect one of the electrical contacts to the frame plate 8. A pair of normally closed contacts 90, 110 are contained in the housing. The one contact 90 extends along the side 84 of the housing, follows the apex formed by sides 80, 84 of the housing, follows the apex formed by sides 80, 84 and along side 80. The other contact 110 extends along side 80 past the end of contact 90.

The switch is controlled by a pin 62 which extends through aligned arcuate slots in side plate 8 and the floor of the plastic housing. This pin is a part of the control mechanism of the reel and moves between two positions which are at the ends of the slots. When the pin is in the position of the drawing, the switch is closed. When the pin moves to the right from the position shown, contact 110 moves away from the end of contact 90 by virtue of its resilience and the switch is opened.

Specific details of the structure of the switch and the reel are set forth in U.S. Pat. No. 3,632,059.

What is claimed is:

1. An electrical switch intended for use with a retraction seat belt assembly, said assembly having a frame plate, a frame slot in said frame plate, and a pin extending through said frame slot, said pin being movable from a first position at one end of said frame slot to a second position at the other end thereof after withdrawal of belting from said assembly, said switch comprising:
   an insulating housing comprising a base, a cover, and sidewalls extending between said base and cover,
   a housing slot in said base, said housing slot having dimensions which are at least equal to the dimensions of said frame slot,
   first and second contact arms in said housing, said first arm extending towards and around the one end of said housing slot which corresponds to said one end of said frame slot and extending transversely away from said housing slot,
   said second arm normally extending in spaced relationship to said first arm and transversely across said housing slot, said second arm being resiliently movable towards, and into engagement with, said first arm whereby
upon mounting said switch against said frame plate of said seat belt assembly with said frame slot in registry with said housing slot, said pin will extend through said housing slot and said second arm will be held against said first arm when said pin is in said first position, and said second arm will be spaced from said first arm when said pin is in said second position.

2. An electrical switch intended for use with a retraction seat belt assembly, said assembly having a frame plate, a frame slot in said frame plate, and a pin extending through said frame slot, said pin being movable from a first position at one end of said frame slot to a second position at the other end thereof after withdrawal of belting from said assembly, said switch comprising:
   a generally triangular housing of insulating material, said housing comprising a base, a cover, and sidewalls extending between said base and cover,
   a housing slot in said base, said housing slot having one end which is adjacent to one apex of said housing, said housing slot having a second end which is centrally disposed on said base, said housing slot conforming in shape to said frame slot,
   first and second contact arms in said housing, said first arm extending along one side of said housing towards said one apex, around said one end of said housing slot, and generally along the side of said housing which is adjacent to said one side and which extends from said one apex,
   said second arm normally extending in spaced relationship to said adjacent side and towards said one side and transversely across said housing slot, said second arm being resiliently movable towards
   said adjacent side and into engagement with said first arm whereby,
upon mounting said switch against said frame plate of said seat belt assembly with said frame slot in registry with said housing slot, said switch arms will be against each other and said switch will be closed when said pin is in said first position, and said second arm will be in its normal position and said switch will be open when said pin is in said second position.

3. A switch as set forth in claim 2 wherein one of said contact arms has an integral mounting portion, said mounting portion being adapted to receive a metallic fastener to mechanically connect said switch to said frame plate and to selectively electrically connect said one arm to said frame plate.

4. A switch as set forth in claim 3 wherein said one contact arm comprises said second arm.

5. An electrical switch intended for use with a retraction seat belt assembly, said assembly having a frame plate, a frame slot in said frame plate, and a pin extending through said frame slot, said pin being movable from a first position at one end of said frame slot to a second position at the other end thereof after withdrawl of belting from said assembly, said switch comprising:
   a generally triangular housing of insulating material, said housing comprising a base, a cover, and sidewalls extending between said base and cover,
   a housing slot in said base, said housing slot having one end which is adjacent to one apex of said housing, said housing slot having a second end which is centrally disposed on said base, said housing slot conforming in shape to said frame slot,
   first and second contact arms in said housing, said first arm extending along one side of said housing towards said one apex, around said one end of said housing slot, and generally along the side of said housing which is adjacent to said one side and which extends from said one apex, said second arm normally extending in spaced relationship to said adjacent side and towards said one side and transversely across said housing slot, said second arm being resiliently movable towards said adjacent side and into engagement with said first arm, said second arm having an integral mounting portion, an opening in said mounting portion and an opening in said base, said openings being in alignment with each other, and a mounting projection integral with, and extending from, said base, said mounting projection being adapted to enter an opening in said frame plate whereby, upon mounting said switch against said frame plate by means of said mounting projection and a metallic fastener which is adapted to extend through said frame plate and said aligned openings and with said housing slot in alignment with said frame slot, said pin will extend into said housing, and said second contact arm will be held against said first contact arm when said pin is at said one end of said housing slot so that said switch will be closed, and said second arm will be permitted to move away from said first arm when said pin is at said other end of said housing slot to open said switch.

* * * * *